United States Patent Office.

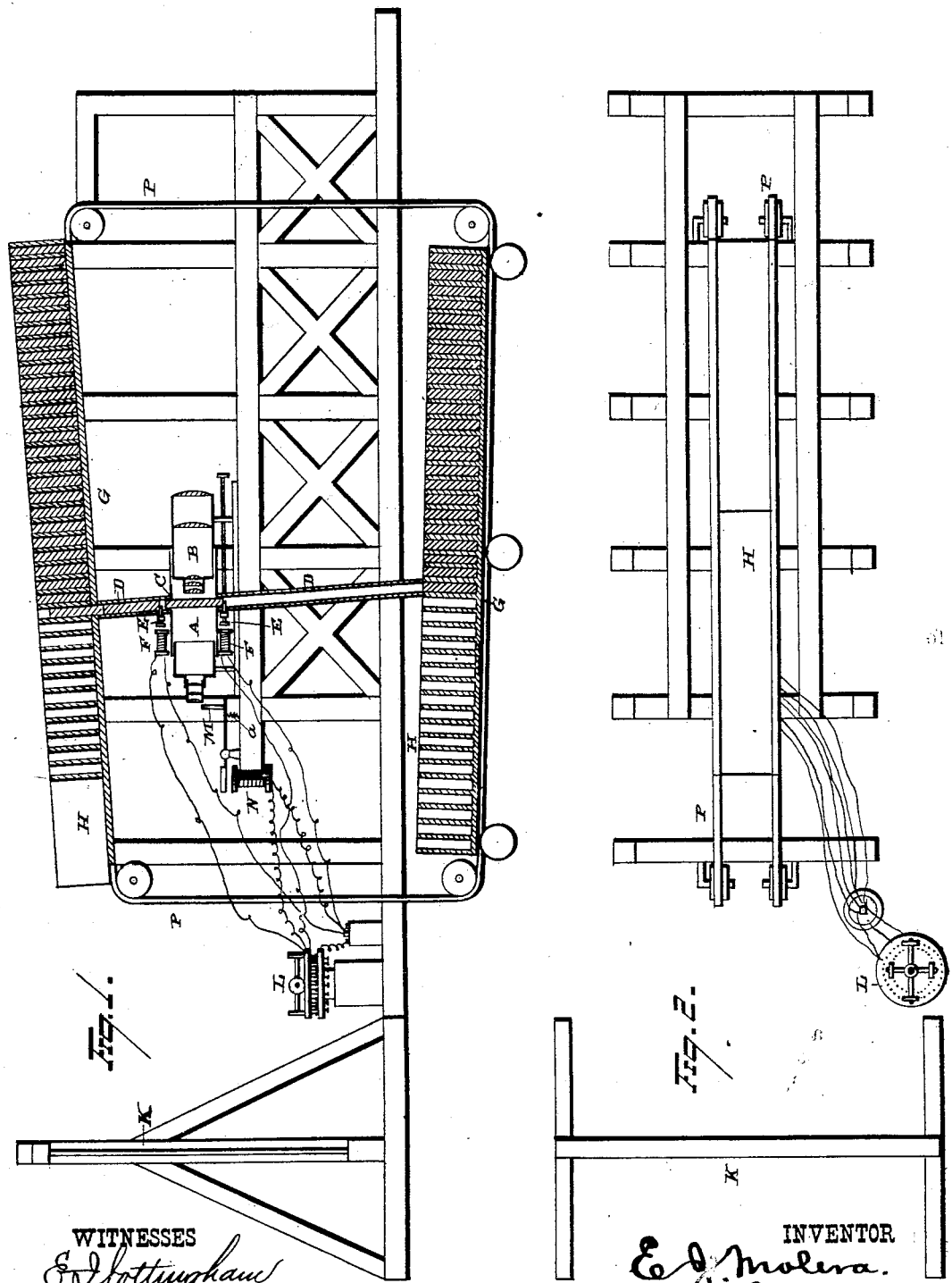

EUSEBIUS J. MOLERA AND JOHN C. CEBRIAN, OF SAN FRANCISCO, CAL.

CAMERA ATTACHMENT.

SPECIFICATION forming part of Letters Patent No. 230,319, dated July 20, 1880.

Application filed January 27, 1880.

*To all whom it may concern:*

Be it known that we, EUSEBIUS J. MOLERA and JOHN C. CEBRIAN, of San Francisco, in the county of San Francisco and State of California, have invented certain new and useful Improvements in Camera Attachments; and we do hereby declare the following to be a full, clear, and exact description of the invention, such as will enable others skilled in the art to which it pertains to make and use it, reference being had to the accompanying drawings, which form part of this specification.

Our invention provides means for quickly and automatically producing positives from a negative containing, in greatly-reduced dimension, any matter capable of being photographed.

A separate pending application of our own or a patent relates to the photographic means employed by us in reducing on a single plate matter which, in its ordinary size of character, would cover a much greater extent of surface.

Still another application for a patent relates to the microscopical means employed by us in reading the reduced matter.

The present invention relates to the apparatus by which we print the positives from the reduced negative. Our object is to subject the sensitized plates in rapid succession to the action of the camera, delivering the plates to the camera, and discharging them therefrom by automatic mechanism.

Our improvements consist, first, in the combination, with a camera and an intersecting chute which extends above and below it, of two automatic spring-pressed stops, respectively adapted to control communication between the upper and lower sections of the chute with the camera; second, in the combination, with a camera and a chute which intersects it, of automatic spring-pressed stop controlling said intersecting communication, and an electro-magnet which operates to retract the stop; third, in the combination, with a camera and two ways located respectively above and below it, of a chute which intersects the camera and whose extremities connect with the ways, and plate-carriers adapted to move over the latter; fourth, in the combination, with a camera, an intersecting chute, and two ways respectively located above and below the camera and connecting with the chute extremities, of a plate-carrier which moves over the upper way and is formed without a bottom, and a plate-carrier which moves over the lower way and is formed without a top; fifth, in the combination, with a camera, a chute which intersects it, and ways intersecting the chute, of plate-carriers which move over the ways and a connecting-belt which maintains said carriers moving at the same rate of speed.

Referring to the drawings, Figure 1 is a central vertical section of the invention. Fig. 2 is a plan view of the same.

The camera employed consists of a photographic camera, A, a microscopical focusing apparatus, B, and an intermediate plate-holder, C. The latter has both upper and lower communication with a chute, D. Spring-pressed or automatic stops E respectively control these communications. Electro-magnets F operate to retract the stops and permit free passage through the chute. Upper and lower ways G intersect the chute respectively at both extremities. Plate-carriers H are adapted to have longitudinal movement on these ways, and they or the sensitized plates should be adapted in any desired manner to prevent injury to said plates. The plate-carrier which moves over the upper way is formed with an open bottom, so that as the plates are successively brought to the point at which said carrier intersects the chute they may pass into the latter. Preferably we make this plate-carrier with a detachable bottom, so that after the carrier is filled with plates and placed on the way the bottom may be drawn out and the plates rested on the way. The plate-carrier which moves over the lower way is provided with an open top, so that the plates which have been subjected to the action of the camera may pass through the chute onto said carrier. The negative from which the positives are to be printed is placed in the frame K. The electro-magnets which control the chute-stops are connected with an electric switch, L, adapted to close the respective circuits through them at predetermined intervals. The objective glass of the camera is provided with an adjustable screen, M, which is maintained in a position free from the glass by a spring, *a*. An electro-magnet, N, connects with the switch L, and at any predetermined time the circuit is closed in the electro-magnet, and the latter overcomes the pressure of spring a and draws the screen over the glass.

The electric switch being duly adjusted, it first operates to cause the screen to be drawn over the objective-glass so as to intercept the focal line of the camera during the time that the plates are changing their positions. The switch, secondly, causes the lower stop to be retracted, so as to permit the plate which has received an impression to pass onto the lower carrier. The switch then operates to cause the upper stop to be retracted, so that a fresh plate may pass into the plate-holder. A final operation of the switch causes the screen to be removed from the glass and an impression is taken. After a due interval the foregoing operation is repeated.

The chute should be lined, or otherwise adapted so that the sensitized plates may not be injured during their passage therethrough. When the lower plate-carrier is filled it should be covered and taken to a dark room.

The upper and lower ways may be inclined in opposite directions, so that the gravity of the plate-carriers may automatically move the latter over them; or any suitable means may be employed to actuate said carriers.

It is obvious that changes, substitutions, and omissions may be made in the detail mechanism of the foregoing described apparatus, provided only that the elements of invention set forth in the following claims are employed.

It is also apparent that certain parts of the invention are relatively distinct and may be independently used or omitted.

The peculiar camera herein described, the automatic screen for the objective glass, and the electric switch constitute the subject-matter of other applications for patents, and hence they are not claimed as part of this invention.

Having fully described our invention, what we claim as new, and desire to secure by Letters Patent, is—

1. The combination, with a camera and an intersecting chute which extends above and below it, of two automatic stops, respectively adapted to control the communication of the upper and lower sections of the chute with the camera, substantially as set forth.

2. The combination, with a camera and a chute which intersects it, of an automatic spring-pressed stop controlling said intersecting communication, and an electro-magnet which operates to retract the stop, substantially as set forth.

3. The combination, with a camera and two ways located respectively above and below it, of a chute which intersects the camera and whose extremities connect with the ways, and plate-carriers adapted to move over the latter, substantially as set forth.

4. The combination, with a camera, an intersecting chute, and two ways respectively located above and below the camera and connecting with the chute extremities, of a plate-carrier which moves over the upper way and is formed without a bottom, and a plate-carrier which moves over the lower way and is formed without a top, substantially as set forth.

5. The combination, with a camera, a chute which intersects it, and ways intersecting the chute, of plate-carriers which move over the ways and a connecting-belt which maintains said carriers moving at the same rate of speed, substantially as set forth.

In testimony that we claim the foregoing—

I, EUSEBIUS J. MOLERA, do hereunto set my hand this 16th day of January, A. D. 1880.

EUSEBIUS J. MOLERA.

Witnesses:
 THOMAS D. GRAHAM,
 GEO. J. SPECHT.

And I, JOHN C. CEBRIAN, do hereunto set my hand this 15th day of December, 1879.

JOHN C. CEBRIAN.

Witnesses:
 T. B. HALL,
 A. W. BRIGHT.